US006467908B1

(12) United States Patent
Mines et al.

(10) Patent No.: US 6,467,908 B1
(45) Date of Patent: Oct. 22, 2002

(54) MANNEQUIN

(75) Inventors: Nicholas Peter Mines; Geoffrey Charles Mitchell, both of Surrey (GB)

(73) Assignee: A.T.O.M. Limited (GB)

( * ) Notice: Subject to any disclaimer, the term of this patent is extended or adjusted under 35 U.S.C. 154(b) by 0 days.

(21) Appl. No.: 09/485,334

(22) PCT Filed: Aug. 11, 1998

(86) PCT No.: PCT/GB98/02417

§ 371 (c)(1), (2), (4) Date: Mar. 28, 2000

(87) PCT Pub. No.: WO99/08259

PCT Pub. Date: Feb. 18, 1999

(30) Foreign Application Priority Data

Aug. 11, 1997 (GB) ............................................ 9716981

(51) Int. Cl.[7] ................................................ G03B 21/00
(52) U.S. Cl. ......................................................... 353/28
(58) Field of Search ........................... 353/28, 122, 119

(56) References Cited

U.S. PATENT DOCUMENTS 1,653,180 A * 12/1927 Jalbert
4,978,216 A * 12/1990 Liljegren et al. ............. 353/28
5,221,937 A * 6/1993 Machtig ...................... 353/28

* cited by examiner

*Primary Examiner*—William Dowling
(74) *Attorney, Agent, or Firm*—Caesar, Rivise, Bernstein, Cohen & Pokotilow, Ltd.

(57) ABSTRACT

A mannequin comprises a translucent headshell rigidly connected to a projection assembly which is mounted on a ball-and-socket joint on the torso. The headshell is movable about three axes by a gimballed motor arrangement.

16 Claims, 4 Drawing Sheets

MANNEQUIN

The invention relates to a video mannequin for mimicking a subject's head-movement and facial expression.

Video mannequins are known, e.g. from U.S. Pat. No. 3,973,840, WO 93/11523 and U.S. Pat. No. 5,221,937 but known video mannequins cannot display any head movement.

It has now been found that a surprising improvement in realism can be obtained by providing a movable headshell and a projector (e.g. a video projector) which can move with the headshell.

Accordingly the invention provides a mannequin comprising a translucent headshell which is movable with respect to its torso and having means for projecting a facial image onto the interior of the face portion of the headshell, the projecting means being arranged to move with the translucent headshell.

Preferred features of the mannequin are defined in dependent claims.

Preferred embodiments are described below by way of example only with reference to FIGS. 1 to 7 of the accompanying drawings wherein.

Figure 1:
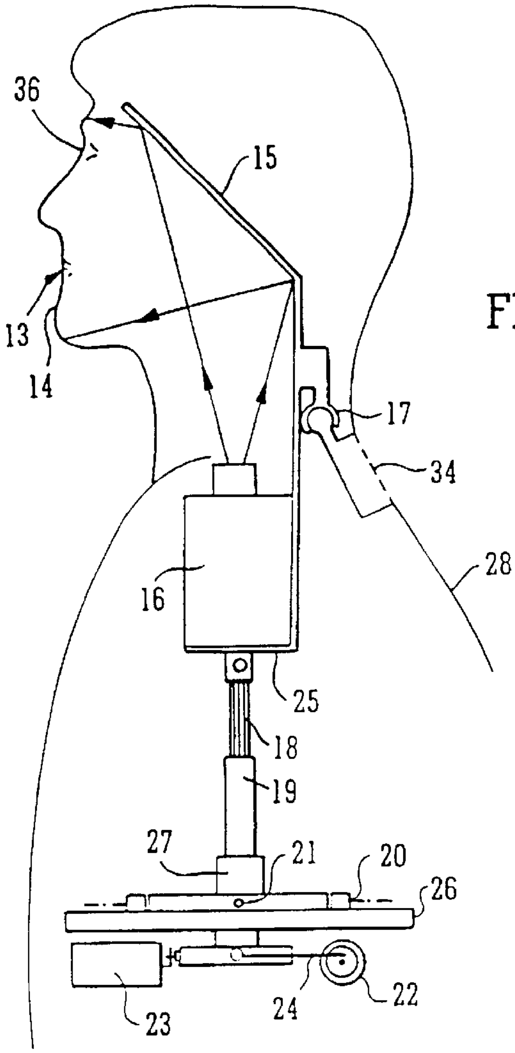
FIG. 1 is a diagrammatic side elevation of a mannequin in accordance with the invention.

Referring to FIG. 1, the mannequin comprises a headshell 13 having a translucent face portion which may be similar to that of U.S. Pat. No. 3,973,840 for example. The eyes region 36 and mouth region 14 are smooth and featureless. A projection assembly comprising an upwardly directed projector 16 and a forwardly inclined mirror 15 project a previously recorded moving facial image onto the interior of the face region of the headshell. The eye and mouth features are provided by the projected video and not by markings on the headshell. The projected video image is visible from the exterior of the mannequin and appears as a realistic human face.

Fill-in lamps (not shown) could be provided to illuminate all of the facial area, even when the projector is off. In general, careful use of ambient lighting will achieve the best effects.

The projection assembly is mounted on a generally L-shaped platform 25 which is secured to the interior of the head arrangement, the assembly being supported at its rear by a ball-and-socket bearing 17 which is mounted on the rear neck portion of the torso portion 28 of the mannequin. In a variant the ball-and-socket bearing is replaced by a virtual joint such as a gimbal assembly. This enables movement of 360° for special effects. A flexible skinlike material 34 is provided around the neck portion to enable a natural-looking movement of the headshell.

Figure 2:
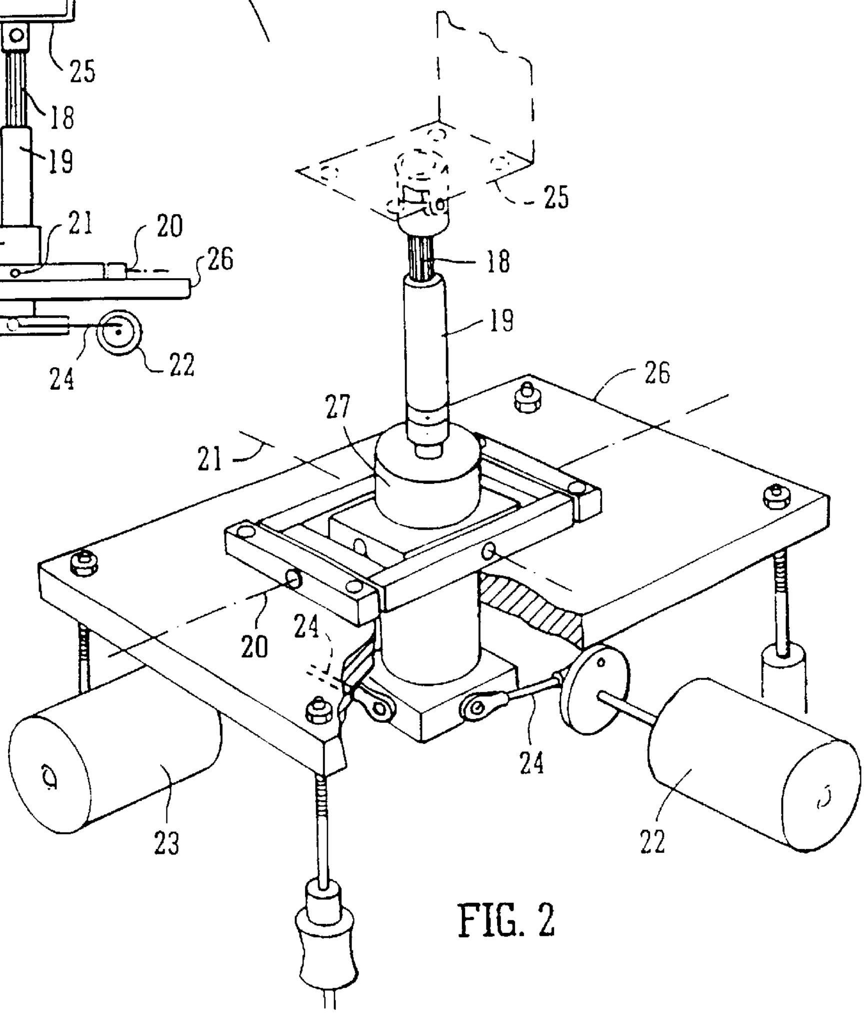
FIG. 2 is a sketch perspective view, showing a platform partially cut away, of the drive arrangement of FIG. 1.
Figure 3:
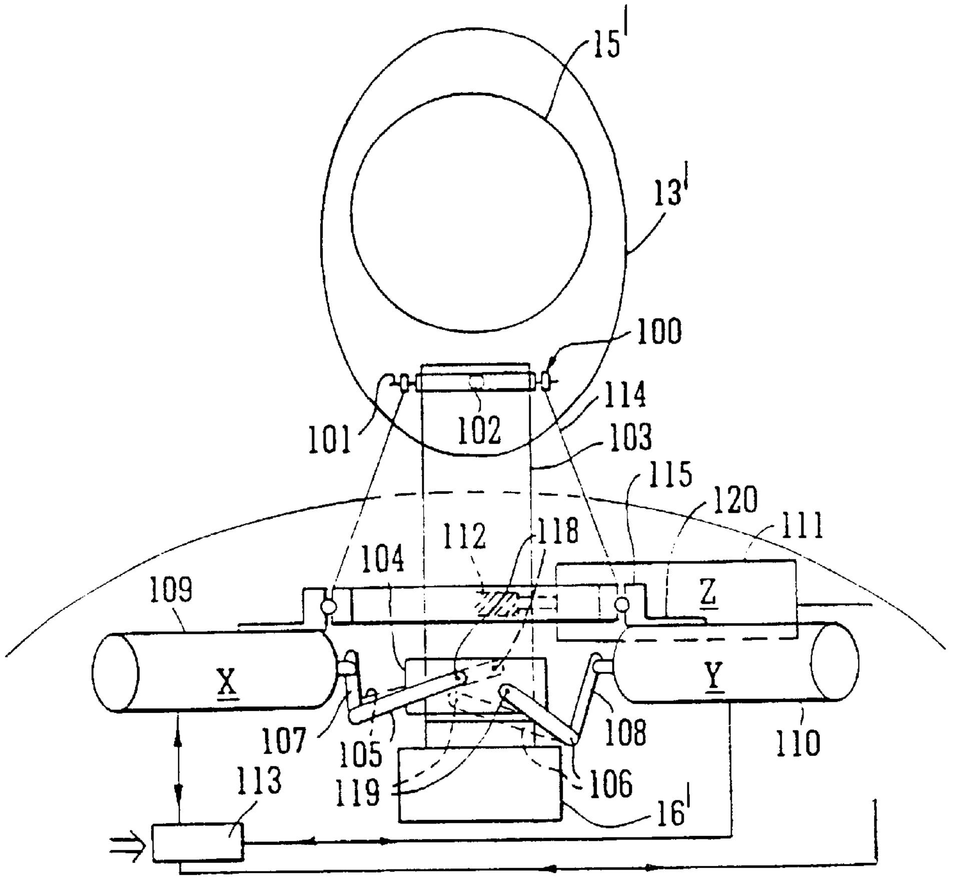
FIG. 3 is a diagrammatic front elevation of a further embodiment.

Referring now to FIGS. 1 and 2, the drive arrangement comprises a rotating motor 27 coupled to an upright shaft 19 which has a splined connection to an inner shaft 18 and transmits drive about a nearly vertical axis to the headshell via a universal joint.

Rotating motor 27 is pivotable about orthogonal horizontal axes 20 and 21 (FIG. 2) by a gimbal arrangement mounted on fixed platform 26 and is coupled by links 24 to further drive motors 22 and 23 which tilt the assembly in the forward-rearward direction (e.g. to indicate "YES") and in the sideways direction (e.g. to indicate "MAYBE") respectively. Motor 27 forms the means to look left and right, shaking the head as in "the no movement". Motors 22 and 23 produce the looking up and down and side to side movement.

Referring to FIG. 2, the presently preferred embodiment comprises a translucent headshell 13' similar to that of the first embodiment and supported rigidly on the upper end of a tube 103 which carries an upwardly directed projector 16' at its lower end.

The above assembly is supported at the upper end of tube 103 by a gimbal arrangement 100 which is in turn carried in the mouth of a frusto-conical tube 114, tube 114 being mounted for rotation about the vertical (z) axis on a bearing 115 which is fitted to its lower (large) end and is itself supported on a fixed mounting 120 in the torso of the mannequin. Pivot mountings 101 between the inner and outer rings of gimbal assembly 100 and pivot mountings 102 between the inner ring of the assembly and tube 103 allow the headshell assembly to tilt freely in any direction whilst the beam from the video projector 16' remains focussed on the interior face region of the headshell by virtue of a forwardly inclined mirror 15' which is located within the headshell.

The headshell assembly is rotated about the z axis by z-drive motor 111, which carries a worm wheel 112 which engages corresponding teeth in the outer peripheral surface of the mouth of tube 114.

Figure 4:
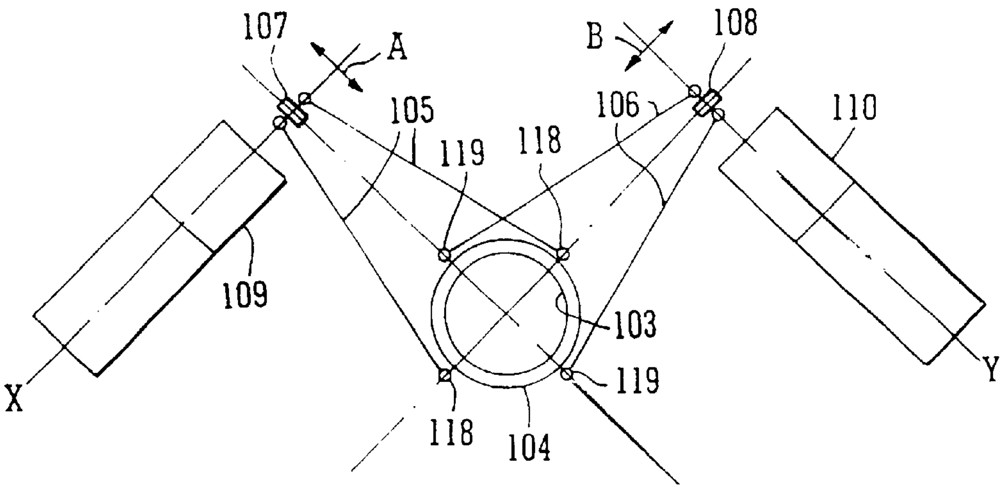
FIG. 4 is a diagrammatic plan view showing the tilting arrangement of the further embodiment.

The assembly is tilted by x and y motors 109 and 110 respectively about the (horizontal) x and y axes, as best seen in FIG. 4. The motors carry cranks 107 and 108 respectively on their shafts, the free end of each crank being flexibly pivotally connected to a pair of arms 105, 106 respecitvely which are pivotally connected (at 118, 119 respectively) to a collar 104 carried on tube 103 which transmits tilting movement to the tube 103 and associated headshell assembly.

As best seen in FIG. 4, the pivot connections 118 are diametrically opposed and define a tilt axis which is orthogonal to that similarly defined by opposed pivot connections 199. All the above connections are flexible to accommodate tilting in directions A and B.

Figure 5:
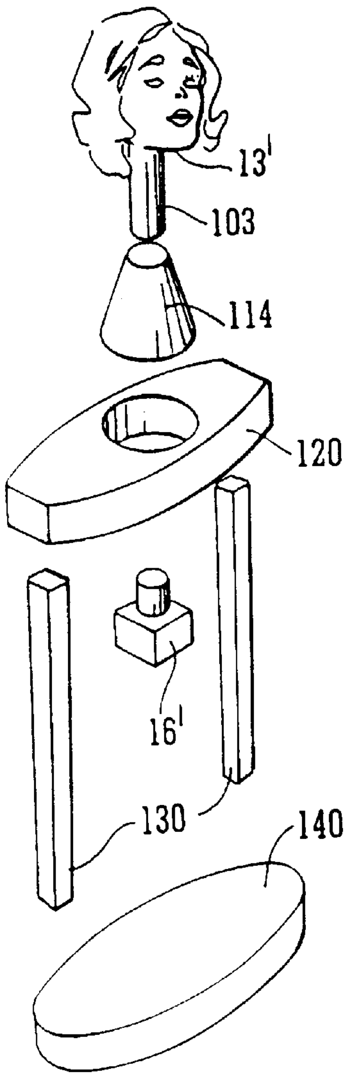
FIG. 5 is an enploded sketch perspective view of the major parts of the further embodiment.

As shown in FIG. 5, the support for mounting 120 comprises a base plate 140 which is rigidly connected to the interior of the mannequin torso and carries two upright rectangular steel tubes. Frusto-conical tube 114 (previously referred to) is supported by its bearing on mounting plate 120 and tube 103, carrying the headshell 13' is gimballed to the upper end of tube 114 as already described.

Figure 6:
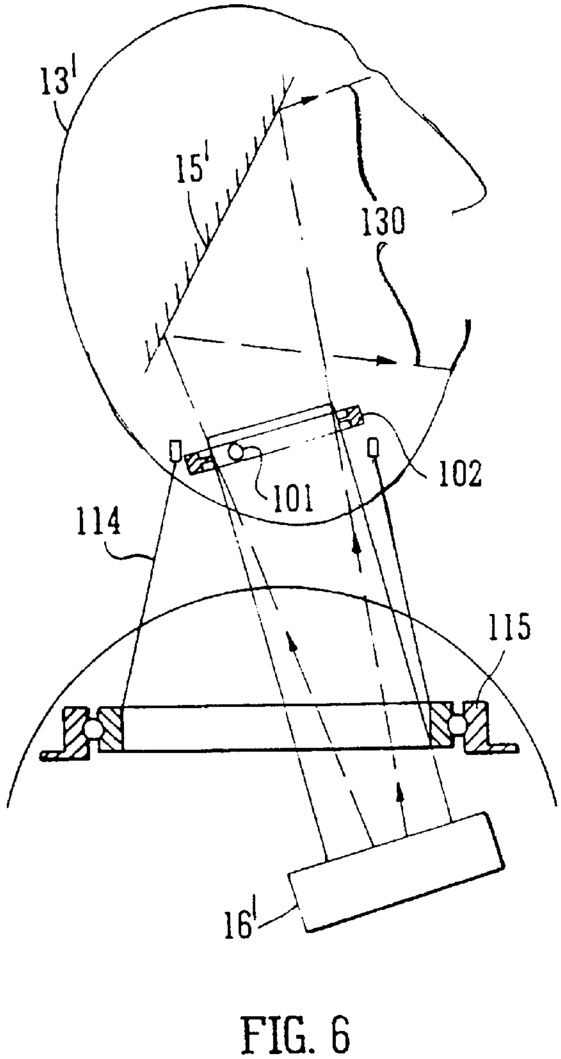
FIG. 6 is a schematic side elevation showing rearward tilting of the head in the further embodiment.

FIG. 6 shows the rearward tilting of the headshell 13' and it will be seen that pivot 101 is mounted towards the rear of its associated gimbal ring. The moving video image is projected onto the interior front surface of headshell 13' as shown by ray lines 130.

Figure 7:
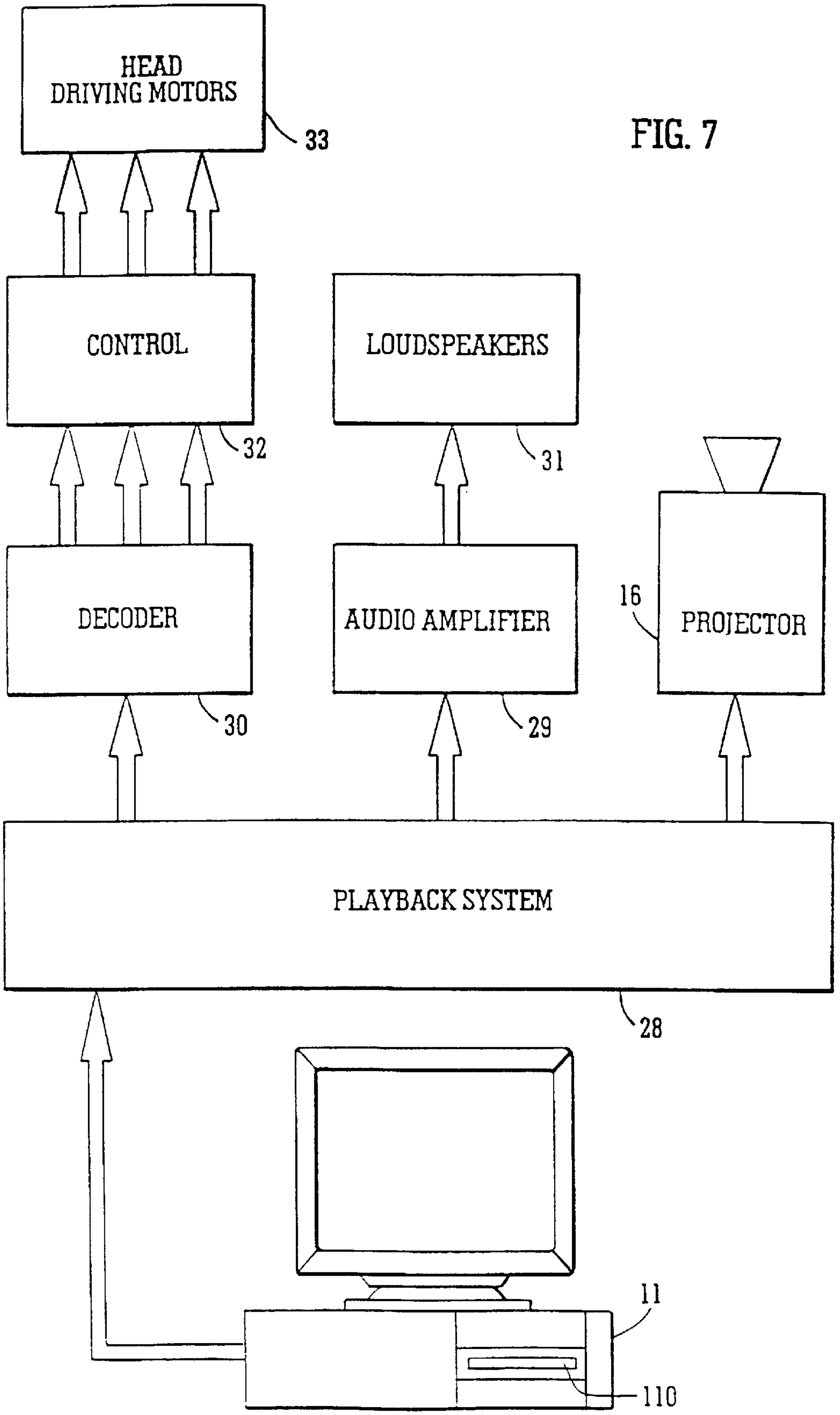
FIG. 7 is a block diagram of an electrical control system for the mannequins of FIGS. 1 and 2 and FIGS. 3 to 6.

The control system for the mannequin of both embodiments is shown in FIG. 7 and comprises a playback system 28 which transmits head movement control signals of one of the two audio channels via a decoder 30 and control circuitry 32 to the head drive motor 33 (i.e. motors 22, 23 and 27). Movement is in proportion to applied signal. Position-sensing feedback is provided by a potentiometer or other absolute encoder (not shown). A digital binary word type encoder could also be employed.

Audio signals taken from the other audio channel are directed via an amplifier 29 to loudspeakers 31 (not shown in FIGS. 1 and 2 but located in e.g. the torso of the mannequin) and video signals are transmitted to the projector 16. Hence the sound, facial appearance and head motion of the subject are mimicked by the mannequin.

A computer 11 is programmed to synchronise (e.g. by tagging the respective streams of data) motion capture signals with video and audio signals obtained by filming a live actor or actress, and to convert the motion capture signals to a format suitable for driving the mannequin so as to mimic the motion of the subject The signals can be stored on a CD-ROM played on a CD-ROM drive 110 incorporated in computer 11.

The mannequin may also be provided with motorised limbs which could similarly be controlled by motion signals also decoded from the movement audio channel.

In a variant, the drive motors are located between the shoulders of the mannequin. They can be pneumatic or hydraulic rather than electric. A push-pull cable arrangement could be used to transmit drive.

The invention is not limited to the embodiment shown. Other movements such as breathing, shrugging of shoulders, rotating the torso, pelvic movement (rotate and bend) and realistic movements to the arms, hands and legs are feasible. In general, a mechanism can be provided to simulate any human movement. By using a motion capture arrangement an actor can remotely interact in real time with viewers of the mannequin.

The apparatus can be programmed so that the mannequin gives specific dialogue in response to movement sensors, voice prompts, pressure mats and the like. The mannequin need not represent a human, it is possible to manipulate features of real or mythical creatures. Two or more mannequins can be programmed to have a conversation.

The systems for playback and movement can be contained within the mannequin, but for ease of servicing and changing of playback material then systems would normally be contained in an external control box/rack connected to the mannequin by an umbilical cable. This cable can be associated with a cable way or hose for passing cooling air to the projector within the mannequin.

The mannequin is preferably operationally portable rather than fixed at a given location.

What is claimed is:

1. A mannequin comprising:

(a) a torso;

(b) a translucent headshell mounted for movement relative to the torso and having an interior face portion;

(c) image-forming means for forming a facial image; and (d) image projecting means for projecting the facial image onto the interior face portion of the translucent headshell, the image-forming means and the image-projecting means being rigidly mounted with respect to the translucent headshell for concomitant movement with the translucent headshell and relative movement with respect to the torso.

2. A mannequin as claimed in claim 1, wherein said translucent headshell has a substantially featureless mouth region, said image-forming means comprises means for forming a mouth feature and said image-projecting means comprises means for projecting the mouth feature onto the substantially featureless mouth region.

3. A mannequin as claimed in claim 1, wherein said translucent headshell has a substantially featureless eyes region, said image-forming means comprises means for forming eye features and said image-projecting means comprises means for projecting the eye features onto the substantially featureless eyes region.

4. A mannequin as claimed in claim 1, wherein said image-forming means and image-projecting means comprises a unitary optical assembly which is pivotally mounted on the interior of said torso.

5. A mannequin as claimed in claim 4, wherein said optical assembly is pivotally mounted on said torso for movement about at least two orthogonal axes.

6. A mannequin as claimed in claim 5, wherein said optical assembly is pivotally mounted on said torso for movement about three orthogonal axis.

7. A mannequin as claimed in claim 4, further comprising drive means coupled to said translucent headshell, wherein said optical assembly is mechanically coupled between the translucent headshell and the drive means.

8. A mannequin as claimed in claim 7, wherein the drive means comprises a first motor having an upright drive axis arranged to swivel said translucent headshell right and left, said motor being pivotally mounted for enabling the drive axis to be tilted.

9. A mannequin as claimed in claim 8, wherein the drive means comprises at least one further motor for tilting said drive axis.

10. A mannequin as claimed in claim 8, wherein said first motor is mounted on gimbal means for enabling tilting of said drive axis in two orthogonal planes.

11. A mannequin as claimed in claim 9, wherein said first motor is mounted on gimbal means for enabling tilting of said drive axis in two orthogonal planes.

12. A mannequin as claimed in claim 10, wherein said first motor is coupled to said translucent headshell by an axially extensible rotary coupling.

13. A mannequin as claimed in claim 11, wherein said translucent headshell is mounted on a ball-and-socket joint.

14. A mannequin as claimed in claim 1, wherein said translucent headshell is mounted on a gimbal mounting.

15. A mannequin as claimed in claim 1, wherein said translucent headshell is carried on a gimbal-mounted hollow frame and the image-forming and image-projecting means are oriented to direct a beam upwardly through the interior of the frame.

16. A mannequin as claimed in claim 15, wherein the gimbal mounting for said frame is itself mounted on a support which is rotatable about an upright axis.

* * * * *